Nov. 25, 1958  W. T. BLAKE  2,861,795
SHOCK ABSORBING MECHANISM
Filed Jan. 22, 1957  2 Sheets-Sheet 1

INVENTOR.
WILLIAM T. BLAKE
BY
Lyon & Lyon
ATTORNEYS

Nov. 25, 1958 W. T. BLAKE 2,861,795
SHOCK ABSORBING MECHANISM
Filed Jan. 22, 1957 2 Sheets-Sheet 2

INVENTOR.
WILLIAM T. BLAKE
BY
ATTORNEYS

United States Patent Office 2,861,795
Patented Nov. 25, 1958

2,861,795

SHOCK ABSORBING MECHANISM

William T. Blake, Fort Worth, Tex.

Application January 22, 1957, Serial No. 635,325

10 Claims. (Cl. 267—8)

This invention relates to a shock absorbing mechanism and more particularly to a hydraulic shock absorbing mechanism for damping vibrations or shocks occurring in moving vehicles such as passenger and freight railway cars, buses, moving vans, motor trucks, automobiles and the like. Although particularly suitable for absorbing shock vibrations in moving vehicles of the type referred to, the shock absorbing mechanism of the invention finds general utility in damping vibrational movement between any two relatively movable elements such as the recoiling and stationary parts of artillery pieces and the like.

Railway freight cars, although they run on relatively smooth track, are subject to severe stresses and shocks due to uncontrolled vertical bounce, sidesway and lateral sidewise movement of the car frame and body with respect to the trucks. Such vibratory movements subject the contents of the cars to damage and require that the freight cargo be braced and properly packaged or crated to avoid excessive damage. Such packaging or crating and bracing imposes considerable expense which could be minimized if the cars were equipped to ride more easily.

Other vehicles, such as railway passenger cars, buses, motor trucks and moving vans, can also be improved as to riding qualities.

A principal drawback of conventional shock absorbers which are mounted between the sprung and unsprung parts of vehicles is that such mechanisms are initially stressed or compressed to varying degrees depending upon the degree of loading of the vehicle and the amount by which the sprung parts of the vehicle settle on their springs. Such initial stressing or compressing of conventional shock absorbers causes them to function differently depending upon the load the vehicle is carrying. Thus, a shock absorber designed for a certain vehicle carrying a certain load will not operate to give design performance when the vehicle is loaded with a different weight.

Accordingly, it is a principal object of this invention to provide a shock absorbing mechanism, more particularly a shock absorbing mechanism of the hydraulic type, that will give optimum performance independently of the vehicle loading.

Another object of the invention is to provide a hydraulic shock absorbing mechanism of the strut type that is easily designed and manufactured to give any reasonably required performance characteristics in absorbing shocks in both upward and downward directions.

Another object of the invention is to provide a hydraulic shock absorbing strut including a static load compensating device whereby the energy absorbing characteristics of the mechanism are independent of the vehicle loading.

Still another object of the invention is to provide a shock absorbing mechanism of the class defined that has great ruggedness and long service life during which maintenance requirements are low. The shock absorbing mechanism of the invention is provided with simple means for protecting the interior of the mechanism from ingress of dust, rain and similar substances that would be injurious to the mechanism.

The foregoing and other aims, objects and advantages of the invention are achieved in a shock absorbing mechanism comprising a cushioning device having a pair of members relatively movable from a self-contained neutral position to absorb energy suddenly applied therebetween and resilient means acting between the members urging them to return to neutral position upon displacement therefrom. The shock absorbing mechanism includes a static load compensating device having a pair of relatively movable members constructed and arranged to have a low response to energy suddenly applied therebetween yet responding by slow relative movement to sustained forces applied therebetween. Means is provided for operatively connecting one of the pair of members of the cushioning device to one of the pair of members of the static load compensating device. The other two of the pairs of members are provided with means for mounting the shock absorbing mechanism between relatively movable elements the vibrations of which are to be damped.

The shock absorbing mechanism of the invention preferably is of the hydraulic type and includes means providing a chamber, more particularly an elongated cylindrical chamber or main cylinder. The main cylinder has a cushioning device therewithin including a cushioning cylinder, a cushioning piston reciprocably mounted in the cylinder, a piston rod fixed to the piston and extending outwardly through one end of the cushioning cylinder and through one end of the main cylinder to the exterior, resilient means such as compression springs acting between the cylinder and piston urging the piston toward a neutral position, and port means in the cylinder on opposite sides of the piston. Also within the main cylinder is a static load compensating device including a load compensating cylinder, a piston reciprocably mounted within the cylinder, a piston rod fixed to the piston and extending outwardly through one end of the cylinder. The load compensating cylinder is fixedly mounted to the main cylinder and the load compensating piston rod is connected to the cylinder of the cushioning device for transmission of movement of the cushioning device thereto. The main cylinder, cushioning device and static load compensating device are adapted to contain a hydraulic fluid. The main cylinder has means for mounting it on one of two relatively movable elements and the cushioning cylinder piston rod has means for attaching it to the other of the relatively movable elements of which the vibrations are to be damped. The load compensating device of the invention has the characteristics of having a low response to suddenly applied energy tending to reciprocate the piston in the cylinder thereof; yet the load compensating device responds by slow movement of the piston in the cylinder to sustained forces tending to reciprocate the piston in the cylinder.

Other features of the invention which will be described in greater detail hereinafter include vacuum relief valves in each end of the cushioning cylinder, a bellows surrounding the cushioning piston rod exteriorly of the main cylinder and mounted between the piston rod and the main cylinder to substantially eliminate ingress of unwanted substances into the interior of the shock absorbing mechanism, baffles in the top of the main cylinder chamber to minimize foaming of the hydraulic fluid in the shock absorbing mechanism as the mechanism performs its work, and a protective sleeve or dust cover reciprocating with the cushioning piston rod and surrounding a portion of the main cylinder to exclude dust and the like.

In the drawings, which show an illustrative embodiment of the invention:

Figure 1:
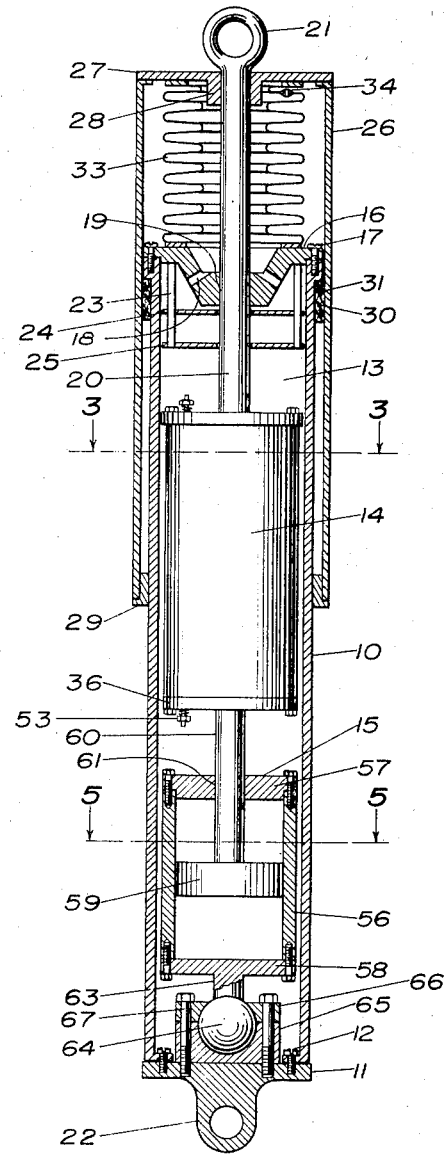
Fig. 1 is a vertical cross-sectional view through a hydraulic shock absorbing mechanism.

Referring to the drawings, the hydraulic shock absorbing mechanism shown has a main cylinder 10 having a bottom closure plate 11 secured to the cylinder by screws 12. The main cylinder provides a chamber 13 within which are located a cushioning device designated by the reference numeral 14 and a static load compensating device designated by the reference numeral 15. The main cylinder 10 has a top closure member 16 secured thereto by screws 17. The top closure member is provided with vents or passages 18 opening therethrough. An axial circular opening 19 through the top closure member provides a bore in which the cushioning device piston rod 20 slides. The piston rod 20 has a ring 21 at its upper end and the bottom closure plate 11 has a perforated lug 22 by means of which the hydraulic shock absorbing mechanism is secured between two relatively movable elements (not shown) the vibrations of which are to be damped.

The upper closure member 16 has depending rods 23 that support horizontally disposed, circular, baffle plates 24 and 25. The baffle plates have central openings through which the cushioning device piston rod 20 passes with a fairly wide clearance. The outer peripheries of the baffle plates 24 and 25 are spaced from the inner wall of the main cylinder 10; thus the mechanism may breathe through the spaces between the baffle plates and the inner wall of main cylinder 10 and the piston rod 20. The baffle plate assembly minimizes foaming of the hydraulic fluid in the chamber 13 by preventing entrapment of air in the liquid and by breaking bubbles already formed. It will be understood that the chamber 13, the cushioning device 14 and the static load compensating device 15 are adapted to be filled with a hydraulic fluid, such as oil, preferably to a level between the two baffle plates 24 and 25, and are so filled when the mechanism is operating.

The shock absorbing mechanism has a dust cover or sleeve 26 having an upper end plate 27 rigidly secured to the piston rod 20 by a collar 28. The lower end of the dust sleeve 26 has a guide bushing 29 that slides freely along the outer surface of the main cylinder 10. A felt wiper ring 30 is secured inside the dust sleeve and around the main cylinder 10 near the top thereof by wire rings 31, and the wiper ring effectively prevents ingress of dust, moisture and other contaminating substances to the interior of the mechanism.

A flexible bellows 33 is mounted between the upper main cylinder closure member 16 and the end plate 27 of the dust sleeve. This bellows may be of metal, neoprene or the like and is hermetically sealed to both the closure member 16 and the end plate 27. The bellows has a vent 34 in the side wall thereof providing a passage between the interior and exterior of the bellows. It will thus be seen that the shock absorbing mechanism can breathe from the top of chamber 13 through vents 18 in the upper end closure 16, vent 34 in the bellows 33, around the felt wiper ring 30 and through the space between the guide bushing 29 and the outer surface of the main cylinder 10.

Figure 2:
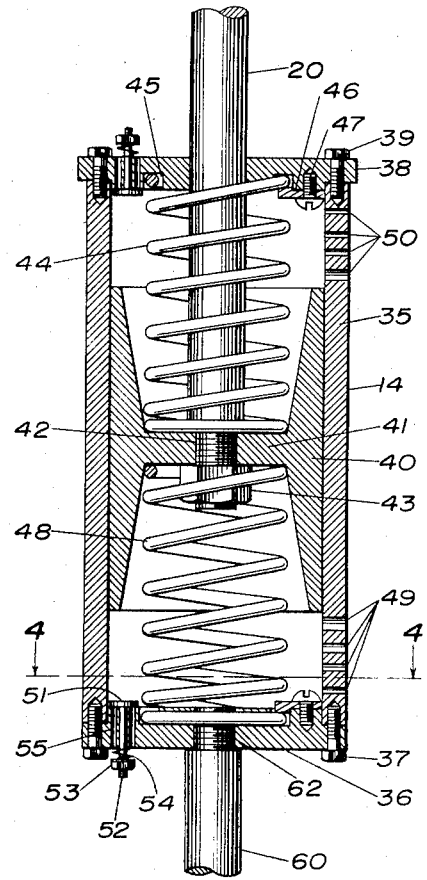
Fig. 2 is an enlarged vertical sectional view of the cushioning device of the shock absorbing mechanism shown in Fig. 1.
Figure 3:
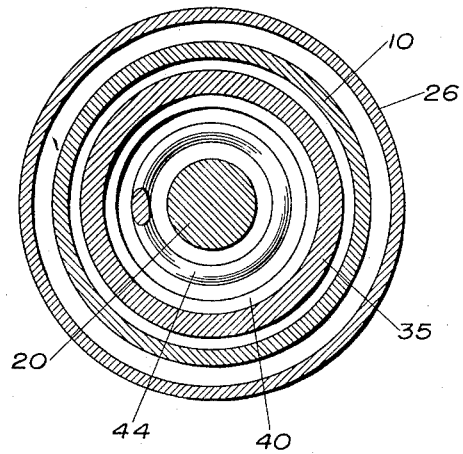
Fig. 3 is an enlarged transverse sectional view taken along the line 3—3 of Fig. 1.
Figure 4:
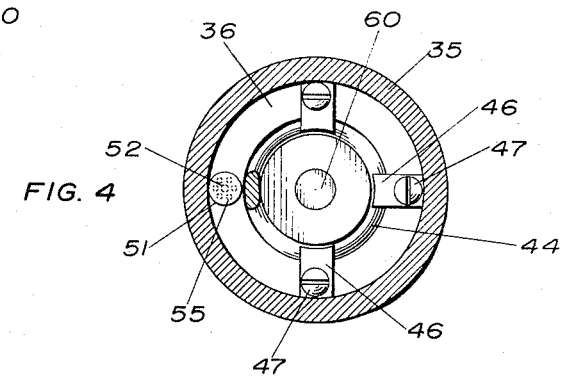
Fig. 4 is a sectional view taken along the line 4—4 of Fig. 2.

Referring to Figs. 2, 3 and 4, the cushioning device shown has a cylinder 35 having a lower cylinder head 36 mounted thereon by screws 37 and an upper cylinder head 38 secured to the cylinder by screws 39. Within the cushioning device cylinder 35 is a piston 40 that has a close sliding fit with the inner wall of the cylinder. The piston is H-shaped as seen in vertical cross-section. It has a horizontal web 41 to which is fastened the inner end of the piston rod 20. The piston rod 20 has a reduced portion 42 threaded in an axial hole in the web 41 and is secured therein by a lock nut 43 threaded to the end of the piston rod 20. Of course, the piston and piston rod may be formed as an integral unit, if desired. Between the piston web 41 and the upper cylinder head 38 a helical compression spring 44 surrounds the piston rod 20. The upper end of the spring 44 is received in a circular groove 45 formed in the under-surface of the cylinder head 38 and retained therein by retainers 46 fastened to the cylinder head by screws 47. The lower end of the spring 44 bears against the upper surface of the piston web 41. A similar helical spring 48 similarly mounted acts between the undersurface of the piston web 41 and the upper surface of the lower cylinder head 36.

Springs 44 and 48 are preferably matched and urge the piston 40 to a neutral position where it is centered longitudinally in the cylinder 35 as shown in Fig. 2. Alternatively, the springs 44 and 48 may be located outside of the cylinder 35 and may act between the piston rod 20 and the cylinder head 38 to urge the piston to neutral position.

A series of ports 49 is formed in the lower end of the cylinder 35 between the bottom of the piston 40 when it is in neutral position and the lower cylinder head 36. A second series of ports 50 is formed through the cylinder 35 near its upper end between the top of the piston 40 when it is in neutral position and the upper cylinder head 38.

In each of the cylinder heads 36 and 38 is located a vacuum relief valve means including a valve 51 carried by a valve stem 52 that slides in a bore in the cylinder head. The valve stem has a nut 53 secured to its outer end and a small helical compression spring 54, acting between the nut 53 and the outer surface of the cylinder head, normally urges the valve to closed position as seen in Fig. 2. The valve in closed position covers a plurality of valve ports 55 provided in the cylinder head.

Figure 5:
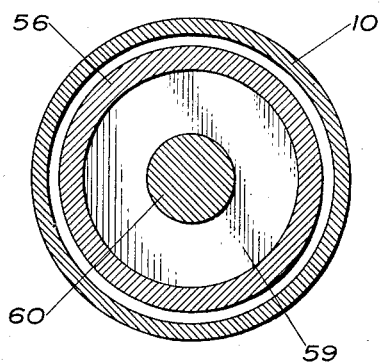
Fig. 5 is an enlarged transverse sectional view taken along line 5—5 of Fig. 1.

The static load compensating device 15 is best seen in Figs. 1 and 5, to which reference is now made. This device has a cylinder 56 having upper and lower cylinder heads 57 and 58 respectively. The cylinder heads are fastened to the cylinder by means of cap screws as shown in Fig. 1. A piston 59 is slidably fitted in the cylinder for reciprocation therein. The piston has a rod 60 that is fixed at its inner end to the piston and that extends outwardly through a bore 61 in the upper cylinder head 57. The upper end of the piston rod 60 is fixed to the bottom cylinder head 36 of the cushioning device, as clearly seen in Fig. 2. The piston rod 60 is threaded at its upper end 62 and the upper end is received in a correspondingly threaded hole in the cylinder head 36.

The static load compensating device 15 is mounted on the lower closure plate 11 of the main cylinder. For mounting the same, the lower cylinder head 58 has an axial depending rod 63 terminating in a ball 64 forming one element of a ball-and-socket joint, the complementary element of which includes a socket having a base plate 65 and a cap 66. The socket, including the cap and base plate, is fastened to the lower closure plate 11 of the main cylinder by screws 67.

The piston 59 of the static load compensating device has a very close sliding fit in the cylinder 56. The sliding fit is such that when forces of the magnitude encountered in service are suddenly applied to the piston through its rod 60 the piston remains substantially immobile in the cylinder. However, if a sustained force is applied to the piston 59, slow seepage of hydraulic fluid through the space between the piston and cylinder wall allows the piston to respond by slow movement in the direction of the force.

The piston rod 60 of the static load compensating device has a close fit in the bore 61 in the cylinder head 57. It will be understood that displacement caused by movement of the piston rod into and out of the cylinder 56 will tend to draw in hydraulic fluid or expel it from the cylinder through the space between the piston rod 60 and the bore 61.

Forces that are suddenly applied to the piston rod are strongly resisted. However, sustained forces will move the piston and rod slowly, displacement of hydraulic fluid being permitted by seepage of hydraulic fluid through the clearance space between the piston rod 60 and the bore 61 and by seepage around the piston. Alternatively, slow flow of hydraulic fluid from one side of the piston to the other may be provided for by forming small passages through the piston from one face to the other. Or, yet again, tiny seepage holes may be provided in the cylinder heads 57 and 58 to allow for the piston action described.

In operation, the hydraulic shock absorbing mechanism of the invention is mounted, for example, on a railway freight car. Four units will ordinarily be used on one freight car. The units are mounted to act in parallel with the main springs of the car between the lower and upper frames of the truck. Each unit is secured to the upper frame of the truck by a pin that passes through the ring 21 and to the lower frame of the truck by another pin that passes through the hole in lug 22. Each truck will have two units, the units being positioned on opposite sides of the truck.

Each unit is so designed and proportioned for a particular installation that the piston 59 of the load compensating device 15 will assume a rest position near the top of the cylinder 56 when the car is in a light or unloaded state. When the car is heavy or fully laden the piston 59 will assume a rest position near the bottom of the cylinder 56. Of course, sufficient space will be left between the piston and the cylinder heads when the piston is in extreme positions to allow a reasonable factor of safety.

When a freight car equipped with hydraulic shock absorbing mechanisms of the invention is in a half loaded condition, the parts of the mechanism will assume rest positions approximately as shown in Figs. 1 and 2. The springs 44 and 48 of the cushioning device will center the piston 40 in the cushioning cylinder 35 and the piston 59 of the load compensating device will be at rest approximately in the center of the cylinder 56.

When the freight car is in motion along a railroad track, it is subjected to bounce, sidesway or side roll, and lateral movements from side to side. These movements are of relatively high frequency and subject the main springs of the freight car to sudden compressive and extensive movements. The shock absorbing mechanism of the invention damps such movements and absorbs a large part of their energy principally through the action of the cushioning device 14. As the sprung parts of the car move suddenly, the piston 40 of the cushioning device is reciprocated in the cylinder 35, the piston being attached to the sprung parts of the car through the piston rod 20 and ring 21. As the piston reciprocates, hydraulic fluid is forced in and out of the cylinder 35 through the ports 49 and 50. Since the bouncing and swaying movements of the sprung parts of the car are of relatively high frequency, they impose only sudden forces on the piston 59 tending to move it in the cylinder 56 of the load compensating device. But due to the low response of the piston 59 to such suddenly applied forces, the piston remains practically stationary in the cylinder and the load compensating device acts as a substantially rigid link between the cushioning device 14 and the lower closure member 11 of the main cylinder.

Railway freight cars are ordinarily designed and constructed so that their main springs cushion and absorb in a smooth manner the bouncing and swaying movements of the car body. However, when such cars are in motion, they frequently develop a harmonic bounce or side roll which greatly overstresses the main springs of the car. The shock absorbing mechanism of the invention effectively reduces such harmonic movements to a safe level, thus insuring that the car rides smoothly and that the load within the car is not damaged.

Preferably, the lower ports 49 of the cushioning device are greater in number and/or aggregate cross-sectional area than the upper ports 50. Thus, downward movements of the car, and with it the piston 40, may take place without great energy absorption in the cushioning device 14; such downward movements are largely cushioned by the main springs of the car. On the other hand it is desirable to absorb considerable energy on upward movements of the car. The upper ports 50, being smaller and fewer in number and having a lesser aggregate cross-sectional area than the lower ports 49 effectively absorb a large portion of the energy of upward movement of the car. Of course, aggregate cross-sectional areas of the upper and lower port systems may be varied to produce whatever cushioning result is desired.

It will be seen, with particular reference to Fig. 2, that the piston 40 in its neutral, central position leaves uncovered both the upper ports 50 and the lower ports 49. On downward movement of the piston, the ports are closed by the piston successively from top to bottom so that the rate of absorption of energy is greater the nearer piston 40 approaches the bottom of the cylinder. Similar energy absorption is realized on upward movement of the piston 40 but in a reverse sense. This acceleration of energy absorption is effected not only by disposing the ports longitudinally of the cylinder but also by making the individual ports progressively smaller in cross-section toward the respective ends of the cushioning cylinder 35.

The operation of the shock absorbing mechanism has been described with reference to a half loaded car. If the car is running light, the action of the cushioning device 14 is unchanged. Under such loading conditions, the load compensating device reacts by movement of the piston 59 to the upper portion of the cylinder 56. In this position, the load compensating device effectively resists sudden shocks and acts as a substantially rigid link between the cushioning device and the main cylinder closure plate 11. When the car is at rest and unloaded the piston 40 of the cushioning device 14 reaches its neutral position as shown in Fig. 2. Similarly if the car is fully loaded, the rest position of the relatively movable parts of the cushioning device is also as shown in Fig. 2. However, owing to the depressed position of the car body when fully loaded, the piston 59 of the load compensating device will move to a lower position in the cylinder 56, such movement taking place gradually as the car is loaded and downward force is slowly applied through the cushioning device 14 to the piston rod 60 of the load compensating device.

It will therefore be seen that in any state of loading of the car, the cushioning action of the cushioning device 14 remains the same and the various positions of the car body due to degree of loading are effectively compensated by movement of the piston 59 in the cylinder 56.

Cushioning movements of the piston 40 of the cushioning device occur relatively suddenly. Because the ports 50 may be entirely or partially closed when the piston is in an upper position, the piston may tend to draw a vacuum within the upper part of the cylinder 35 as it is suddenly moved downwardly and away from the upper cylinder head 38. To prevent the formation of voids in the liquid in the upper part of the cylinder, the vacuum relief valve means 51—55 opens to allow hydraulic fluid to enter the cylinder through the bores 55 thereby preventing formation of voids. When the piston 40 is at rest or in movement toward the cylinder head 38, the vacuum relief valve 51—55 is closed and the ports 50 control piston movement.

The vacuum relief valve in the lower cylinder head 36 of the cushioning device operates in a like manner to prevent formation of voids in the hydraulic fluid in the lower portion of the cylinder.

Referring to Fig. 1, it will be seen that the cushioning device, including its cylinder, piston and piston rod, and the static load compensating device, including its cylinder, piston and piston rod, are in axial alignment. It will also be seen that the compensating device support rod 63 and the ball-and-socket mounting 64—67 are also in axial alignment with the load compensating device and cushioning device. The axially aligned ball-and-socket mounting device performs an important function in preventing the moving parts of the mechanism from binding during inward and outward movement. The ball-and-socket mounting permits the load compensating device cylinder 56 to swing slightly to align itself with the other parts of the mechanism during their movement. Means equivalent to the ball-and-socket mounting device may be substituted therefor. For example, the load compensating device may be mounted on gimbals or the like.

It may also be noted that the springs 44 and 48 of the cushioning device are relatively light in comparison to the springs of the vehicle on which the mechanism of the invention is installed. The cushioning device springs are not designed to absorb any large amount of energy but are only strong enough to perform their function of centering the cushioning device piston and transmitting slowly applied forces to the static load compensating device, allowance being made for a safety factor.

Although the parts of the illustrative mechanism have been shown and described as being in large measure bolted or screwed together, it will be understood that other fastening means, such as welds, brazings and the like, may be used to good advantage.

I claim:

1. A hydraulic shock absorbing mechanism comprising: means providing a chamber; a cushioning device within the chamber including a piston and cylinder construction providing port means through which hydraulic fluid is moved in response to relative reciprocation of the piston and cylinder to absorb energy suddenly applied therebetween and having resilient means acting between the piston and cylinder urging the piston to a neutral position in the cylinder; a static load compensating device including a piston and cylinder construction providing constantly open, restricted hydraulic fluid metering means through which hydraulic fluid is moved in response to relative reciprocation of the piston and cylinder, said piston and cylinder construction having a low response to suddenly applied energy tending to reciprocate the piston in the cylinder yet responding by slow movement of the piston in the cylinder to sustained forces tending to reciprocate the piston in the cylinder, said static load compensating device being positioned in said chamber means externally of said cushioning device and mounted to act between said cushioning device and said chamber means; and means on said chamber means and on said cushioning device for mounting the shock absorbing mechanism between relatively movable elements the vibrations of which are to be damped; said chamber means, said cushioning device and said static load compensating device containing a hydraulic fluid.

2. A hydraulic shock absorbing mechanism comprising: means providing a chamber; a cushioning device within the chamber including a cylinder, a piston reciprocably mounted in said cylinder, a piston rod fixed to said piston for reciprocating the same and extending outwardly through one end of said cylinder and through said chamber means to the exterior, resilient means acting between said cylinder and piston urging said piston towards a neutral position upon displacement in either direction, and port means in said cylinder on opposite sides of said piston; a static load compensating device within said chamber means including a cylinder, a piston recipocably mounted within said cylinder, a piston rod fixed to said piston for reciprocating the same and extending outwardly through one end of said cylinder, said static load compensating device providing constantly open, restricted hydraulic fluid metering means through which hydraulic fluid is moved in response to relative reciprocation of the piston and cylinder, said static load compensating device having a low response to suddenly applied energy tending to reciprocate the piston in the cylinder yet responding by slow movement of the piston in the cylinder to sustained forces tending to reciprocate the piston in the cylinder; means mounting the cylinder of said static load compensating device to said chamber means; means connecting the piston rod of said static load compensating device to the cylinder of said cushioning device for transmission of movement of said cushioning device cylinder thereto; said chamber means, said cushioning device and said static load compensating device containing a hydraulic fluid; and means on said chamber means and on the piston rod of said cushioning device for mounting the shock absorbing mechanism between relatively movable elements the vibrations of which are to be damped.

3. A hydraulic shock absorbing mechanism as defined in claim 2 wherein in said constantly open, restricted hydraulic fluid metering means, clearances are provided between the piston and cylinder of said static load compensating device and between the piston rod and the opening in the end of the cylinder of the static load compensating device through which the piston rod extends, which clearances are sufficient to allow only slow seepage of hydraulic fluid therethrough when sustained forces are applied tending to move the piston in the cylinder.

4. A hydraulic mechanism as defined in claim 2 wherein the cylinder, piston and piston rod of said cushioning device and the cylinder, piston and piston rod of said static load compensating device are coaxially positioned in said chamber means and said means mounting the cylinder of said static load compensating device to said chamber means includes cooperating ball-and-socket elements, one of which is carried by the cylinder of said static load compensating device and the other of which is carried by said chamber means.

5. A hydraulic shock absorbing mechanism as defined in claim 2 wherein said cushioning device is provided with quick opening vacuum relief valve means in each end of its cylinder, each such valve means being adapted to open as the cushioning device piston moves away from it and to close as the cushioning device piston moves towards it.

6. A hydraulic shock absorbing mechanism as defined in claim 2 including a bellows surrounding the piston rod of said cushioning device outside of said chamber means, said bellows being sealingly secured to the chamber means at one end of the bellows and sealingly secured to the piston rod at the other end of the bellows, said bellows providing a vent opening therethrough to the exterior; said chamber means providing a vent hole establishing communication between the interior of the chamber and the interior of the bellows.

7. A hydraulic shock absorbing mechanism as defined in claim 2 wherein said chamber means includes antifoaming baffle means mounted in the upper end of the chamber.

8. A hydraulic shock absorbing mechanism as defined in claim 2 wherein said cushioning device has said port means located in the side wall of its cylinder and said port means comprises a plurality of longitudinally spaced holes through the side wall of the cylinder, and the cushioning device piston is constructed and arranged to close the port means successively in the direction in which the piston is moved.

9. A hydraulic shock absorbing mechanism as defined in claim 8 wherein the port means in said cushioning device cylinder on opposite sides of its piston have unequal combined cross-sectional areas.

10. A hydraulic shock absorbing mechanism comprising: means providing a chamber; a cushioning device within the chamber including a piston and cylinder construction providing port means through which hydraulic fluid is moved in response to relative reciprocation of the piston and cylinder to absorb energy suddenly applied therebetween and having resilient means acting between the piston and cylinder urging the piston to a neutral position in the cylinder; a static load compensating device including a piston and cylinder construction providing constantly open, restricted hydraulic fluid metering means through which hydraulic fluid is moved in response to relative reciprocation of the piston and cylinder, said piston and cylinder construction having a low response to suddenly applied energy tending to reciprocate the piston in the cylinder yet responding by slow movement of the piston in the cylinder to sustained forces tending to reciprocate the piston in the cylinder, said static load compensating device being positioned in said chamber means externally of said cushioning device and mounted to act between said cushioning device and said chamber means; and means for mounting the shock absorbing mechanism between relatively movable elements the vibrations of which are to be damped; said chamber means, said cushioning device and said static load compensating device containing a hydraulic fluid.

References Cited in the file of this patent

UNITED STATES PATENTS

| | | |
|---|---|---|
| 1,918,697 | Gruss | July 18, 1933 |
| 2,165,617 | Paes et al. | July 11, 1939 |
| 2,333,096 | Dowty | Nov. 2, 1943 |

FOREIGN PATENTS

| | | |
|---|---|---|
| 422,686 | Great Britain | Jan. 16, 1935 |
| 952,367 | France | May 2, 1949 |